(12) United States Patent
Russ

(10) Patent No.: US 9,567,950 B2
(45) Date of Patent: Feb. 14, 2017

(54) TURBOCHARGED ENGINE WITH NATURALLY ASPIRATED OPERATING MODE

(75) Inventor: Stephen George Russ, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 998 days.

(21) Appl. No.: 12/731,647

(22) Filed: Mar. 25, 2010

(65) Prior Publication Data

US 2011/0155108 A1    Jun. 30, 2011

(51) Int. Cl.
| | |
|---|---|
| F02D 23/00 | (2006.01) |
| F02B 33/44 | (2006.01) |
| F02M 35/10 | (2006.01) |
| F02B 37/18 | (2006.01) |
| F02D 41/00 | (2006.01) |
| F02B 29/04 | (2006.01) |

(52) U.S. Cl.
CPC ........ *F02M 35/10163* (2013.01); *F02B 37/18* (2013.01); *F02D 23/00* (2013.01); *F02D 41/0007* (2013.01); *F02B 29/0406* (2013.01); *Y02T 10/144* (2013.01)

(58) Field of Classification Search
CPC ............... F02M 35/10163; F02B 37/18; F02B 29/0406; F02D 23/00; F02D 41/0007; Y02T 10/144
USPC . 60/611, 605.1, 602, 612; 123/564; 702/182
IPC ................ F02B 37/18; F02D 41/0007, 41/005, 41/1454
See application file for complete search history.

(56) References Cited

U.S. PATENT DOCUMENTS

| | | | | |
|---|---|---|---|---|
| 3,049,865 A | * | 8/1962 | Drayer | 60/611 |
| 3,651,636 A | * | 3/1972 | Glassey et al. | 60/611 |
| 3,868,822 A | * | 3/1975 | Keller | 60/611 |
| 4,870,822 A | * | 10/1989 | Kamimaru | 60/611 |
| 4,873,961 A | | 10/1989 | Tanaka | 60/601 |
| 5,408,979 A | * | 4/1995 | Backlund | F02B 37/18 60/602 |
| 6,112,523 A | * | 9/2000 | Kamo et al. | 60/600 |
| 6,311,493 B1 | * | 11/2001 | Kurihara et al. | 60/612 |
| 6,327,856 B1 | * | 12/2001 | Iwabuchi | F02D 41/0007 60/602 |
| 6,557,346 B1 | * | 5/2003 | Oetting et al. | 60/605.1 |

(Continued)

FOREIGN PATENT DOCUMENTS

| | | | |
|---|---|---|---|
| CN | 101526042 A | 9/2009 | |
| FR | 2560289 A1 * | 8/1985 | ............ F02B 33/446 |

(Continued)

OTHER PUBLICATIONS

A Machine translation of Tanaka (Pub. No. JP 2006299859 A), published on Nov. 2, 2006.*

*Primary Examiner* — Thai Ba Trieu
(74) *Attorney, Agent, or Firm* — Julia Voutyras; Brooks Kushman P.C.

(57) ABSTRACT

A system and method for controlling a multiple cylinder internal combustion engine having an exhaust gas turbocharger with a compressor coupled to a turbine include redirecting substantially all intake airflow around the compressor and substantially all exhaust flow around the turbine when an engine operating parameter exceeds an associated threshold. In one embodiment, turbocharger boost is provided below an associated engine speed threshold with the turbocharger compressor and turbine bypassed at higher engine speeds such that the engine operates as a naturally aspirated engine.

8 Claims, 2 Drawing Sheets

(56) References Cited

U.S. PATENT DOCUMENTS

| | | | |
|---|---|---|---|
| 7,174,777 B2 * | 2/2007 | Fischer et al. | 73/114.33 |
| 7,552,588 B2 * | 6/2009 | Magner et al. | 60/602 |
| 7,607,302 B2 * | 10/2009 | Fry | F02B 37/18 60/602 |
| 7,677,227 B2 * | 3/2010 | Sagisaka et al. | 123/559.1 |
| 7,730,724 B2 * | 6/2010 | Shu et al. | 60/602 |
| 7,748,218 B2 * | 7/2010 | McNulty et al. | 60/612 |
| 7,752,844 B2 * | 7/2010 | Dietz | F02B 37/16 60/611 |
| 7,770,392 B2 * | 8/2010 | Birkner et al. | 60/602 |
| 7,779,796 B2 * | 8/2010 | Nakamura | F02D 13/0207 60/605.1 |
| 7,905,091 B2 * | 3/2011 | Kassner | 60/605.1 |
| 7,921,944 B2 * | 4/2011 | Russell et al. | 60/607 |
| 8,001,782 B2 * | 8/2011 | Pursifull | 60/612 |
| 8,011,186 B2 * | 9/2011 | McEwan et al. | 60/602 |
| 8,033,108 B2 * | 10/2011 | Ishikawa et al. | 60/612 |
| 8,244,501 B2 * | 8/2012 | Heinkele et al. | 702/182 |
| 8,468,823 B2 * | 6/2013 | Hitomi | F02D 41/3035 60/611 |
| 2002/0078934 A1 | 6/2002 | Hohkita et al. | |
| 2007/0051349 A1 | 3/2007 | Marumoto et al. | |
| 2007/0062188 A1 | 3/2007 | Fry et al. | |
| 2008/0276614 A1 * | 11/2008 | Shu et al. | 60/602 |
| 2009/0013688 A1 | 1/2009 | Panciroli | |
| 2009/0038309 A1 * | 2/2009 | Cocca et al. | 60/612 |
| 2009/0107142 A1 * | 4/2009 | Russell et al. | 60/608 |
| 2009/0165458 A1 * | 7/2009 | Matthews | 60/600 |
| 2011/0016862 A1 * | 1/2011 | Song et al. | 60/602 |
| 2011/0036086 A1 * | 2/2011 | Liu et al. | 60/602 |
| 2011/0113773 A1 * | 5/2011 | Liu et al. | 60/602 |
| 2012/0037132 A1 * | 2/2012 | Heinkele et al. | 123/559.3 |

FOREIGN PATENT DOCUMENTS

| | | | | |
|---|---|---|---|---|
| GB | 2337792 A | | 1/1999 | |
| JP | 07243332 A | * | 9/1995 | F02B 37/18 |
| JP | 09053457 A | * | 2/1997 | F02B 37/18 |
| JP | 2006299859 A | * | 11/2006 | F02D 23/00 |
| JP | 2009097362 A | * | 5/2009 | F02B 37/013 |
| WO | WO 2008015397 A1 | * | 2/2008 | F02B 37/18 |

* cited by examiner

TURBOCHARGED ENGINE WITH NATURALLY ASPIRATED OPERATING MODE

BACKGROUND

1. Technical Field

Internal combustion engines having an exhaust gas turbocharger.

2. Background Art

Exhaust gas turbochargers include an exhaust turbine that drives a compressor to boost intake pressure above atmospheric to increase power output from the engine. Conventional turbocharged engines utilize the turbocharger for boost throughout the engine operating speed range. This can lead to compromises in the turbocharger selection and/or engine performance because a small, highly responsive turbocharger is desired for low engine speed boost and fast response, with a larger, less restrictive turbocharger desired for increased power at higher engine speeds. Sizing of the turbocharger and other engine components for operation across the engine operating range, particularly for high speed/load operation, may lead to increased cost associated with additional engine structure, increased weight, and more expensive materials to accommodate associated higher peak pressure and higher temperature operation. In addition, increased engine friction losses and weight may be associated with more robust engine structure.

SUMMARY

A system or method for controlling a multiple cylinder internal combustion engine having an exhaust gas turbocharger with a compressor coupled to a turbine includes substantially simultaneously redirecting at least a portion of intake airflow around the compressor and at least a portion of exhaust flow around the turbine in response to at least one operating parameter exceeding a corresponding threshold. In one embodiment, intake and exhaust bypass valves are operated substantially simultaneously to redirect substantially all intake airflow around the compressor and substantially all the exhaust flow around the turbine in response to engine speed exceeding an associated threshold to effectively operate as a naturally aspirated engine at higher engine speeds.

Those of ordinary skill in the art will recognize a number of advantages associated with various embodiments according to the present disclosure. For example, providing boost only at lower engine speeds with naturally aspirated engine operation at higher engine speeds results in a more efficient boosting system as well as a lighter, more efficient, and lest costly base engine. Providing boost at lower engine speeds improves performance feel and may result in improved fuel economy by more effective powertrain matching and engine downsizing for a particular application. In addition, with boost applied only for lower engine speeds, the engine structure and materials do not need to be upgraded resulting in a cost and weight advantage while reducing manufacturing complexity.

The above advantages and other advantages and features will be readily apparent from the following detailed description of the various embodiments when taken in connection with the accompanying drawings.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a downsized turbocharged four-stroke, multi-cylinder internal combustion engine operable in a naturally aspirated mode. Those of ordinary skill in the art may recognize similar applications or implementations with other engine/vehicle technologies including direct injected and/or port injected engines, with various types of valvetrains and valve activation strategies that may include mechanical, electromechanical, and/or hydraulic systems.

Figure 1:
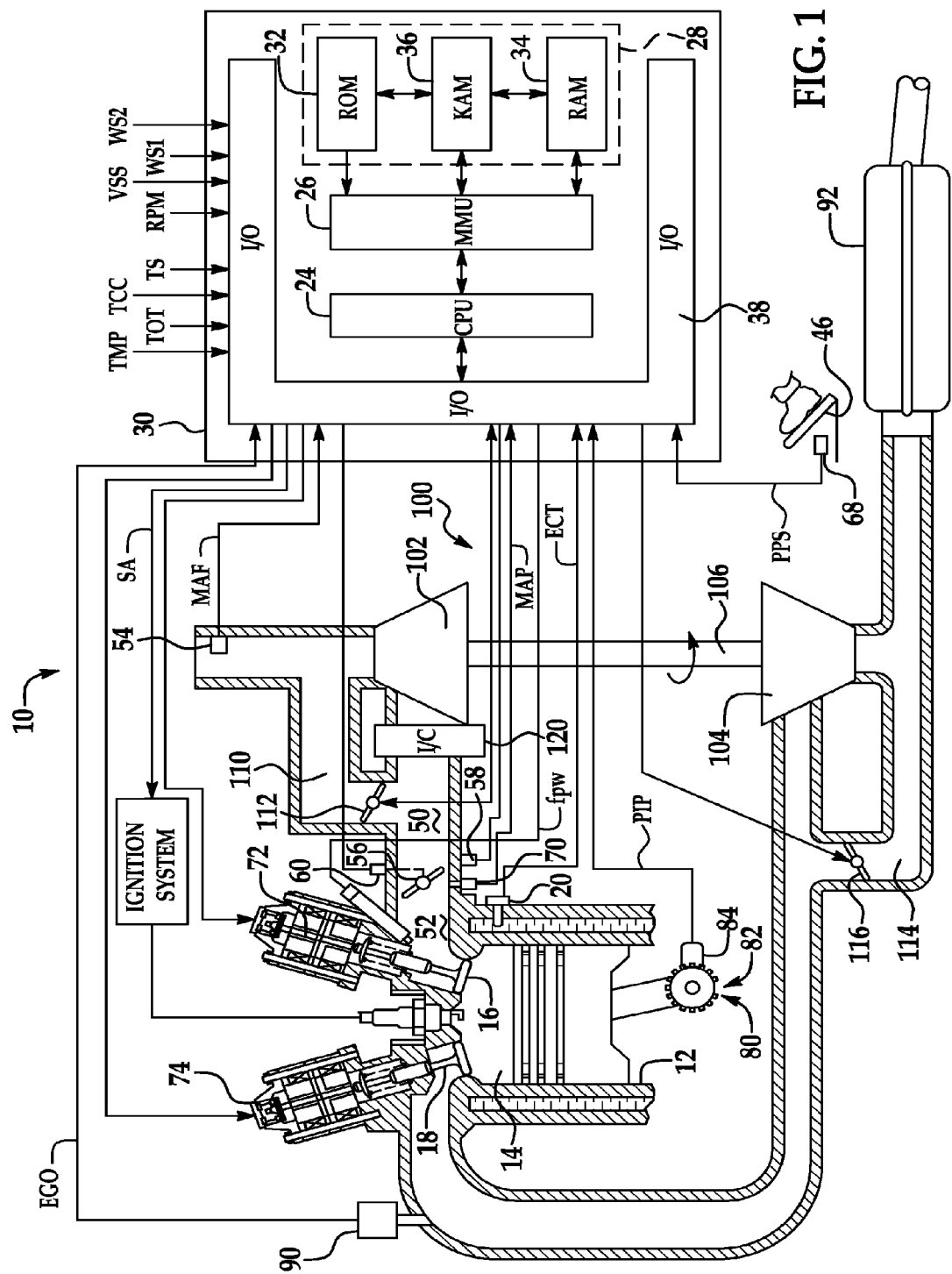
FIG. 1 is a block diagram illustrating operation of a representative engine/vehicle embodiment with turbocharger bypass according to the present disclosure.

In the representative embodiment illustrated in FIG. 1, system 10 includes a vehicle (not specifically illustrated) powered by an internal combustion engine having a plurality of cylinders, represented by cylinder 12, with corresponding combustion chambers 14. As one of ordinary skill in the art will appreciate, system 10 includes various sensors and actuators to effect control of the engine/vehicle. One or more sensors or actuators may be provided for each cylinder 12, or a single sensor or actuator may be provided for the engine. For example, each cylinder 12 may include four gas exchange valves including two intake valves 16 and two exhaust valves 18, with only one of each shown in the Figure. However, the engine may include only a single engine coolant temperature sensor 20. In the embodiment illustrated in FIG. 1, the engine includes electromagnetically or electronically actuated intake valves 16 and exhaust valves 18 in communication with a microprocessor-based controller 30 to control valve opening and closing times. Other embodiments include alternative valve configurations and valve control using mechanical, electromechanical, hydraulic, and/or combination valve actuation. For example, in one embodiment, intake valves 16 are electronically actuated and exhaust valves 18 are conventionally actuated by an associated camshaft (not shown). Alternatively, intake valves 16 and exhaust valves 18 may be conventionally actuated using a cam-in-block configuration with pushrods and rocker arms, for example. In one embodiment, the engine is a downsized LIVC (late intake valve closing) engine operating using a modified Atkinson or Miller combustion cycle for higher efficiency.

Controller 30 may include a microprocessor 24 or central processing unit (CPU), in communication with a memory management unit (MMU) 26. MMU 26 controls movement of data among various computer readable storage media 28 and communicates data to and from CPU 24. Computer readable storage media 28 may include volatile and nonvolatile storage in read-only memory (ROM) 32, randomaccess memory (RAM) 34, and keep-alive memory (KAM) 36, for example. KAM 36 is a persistent or non-volatile memory that may be used to store various operating variables while CPU 24 is powered down. Computer-readable storage media 28 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 24 in controlling the engine or vehicle into which the engine is mounted. Computer-readable storage media 28 may also include floppy disks, CD-ROMs, hard disks, and the like.

CPU 24 communicates with various engine/vehicle sensors and actuators via an input/output (I/O) interface 38. Interface 38 may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU 24. Examples of parameters, systems, and/or components that may be directly or indirectly actuated under control of CPU 24, through I/O interface 38, are fuel injection timing, rate, and duration, throttle valve position, spark plug ignition timing (for spark-ignition engines), intake/exhaust valve timing and duration, front-end accessory drive (FEAD) components such as an alternator, air conditioning compressor, and the like. Sensors communicating input through I/O interface 38 may be used to indicate turbocharger boost pressure, crankshaft position (PIP), engine rotational speed (RPM), wheel speed (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear or ratio (PRN), transmission oil temperature (TOT), transmission turbine speed (TS), torque converter clutch status (TCC), deceleration or shift mode (MDE), for example.

Some controller architectures do not contain an MMU 26. If no MMU 26 is employed, CPU 24 manages data and connects directly to ROM 32, RAM 34, and KAM 36. Of course, more than one CPU 24 may be used to provide engine control and controller 30 may contain multiple ROM 32, RAM 34, and KAM 36 coupled to MMU 26 or CPU 24 depending upon the particular application.

System 10 includes an exhaust gas turbocharger 100 having a compressor 102 mechanically coupled to a turbine 104 by a common shaft 106. A compressor intake bypass passageway 110 selectively redirects intake airflow around compressor 102 based on the position of a compressor bypass valve 112, which is controlled by controller 30 in response to at least one engine and/or ambient operating parameter. Similarly, an exhaust bypass passageway 114 selectively redirects exhaust flow from cylinders 12 around turbocharger turbine 104 based on position of turbine bypass valve 116, which is controlled by controller 30 in response to at least one engine and/or ambient operating parameter. In one embodiment, compressor intake bypass passageway 110 and compressor bypass valve 112 are sized to redirect substantially all intake airflow around compressor 102 when bypass valve 112 is wide open. Depending on the particular application, this may result in bypass passage 110 having a larger cross-sectional area than the upstream intake passage.

Similarly, turbine bypass passage 114 and turbine bypass valve 116 are sized to redirect substantially all exhaust flow around turbine 104 when bypass valve 116 is wide open. This may result in bypass passage 114 having a larger cross-sectional area than the exhaust connected to turbine 104. As described in greater detail herein, various embodiments coordinate control of bypass valves 112, 116 to selectively bypass turbocharger 100 so that the engine effectively operates as a naturally aspirated engine at higher engine speeds.

System 10 may include a mass airflow sensor 54, or other airflow sensor, that provides a corresponding signal (MAF) to controller 30 indicative of the intake or induction airflow. In operation, inducted air is directed through compressor 102 of turbocharger 100 and/or bypass passage 110 depending on the position of compressor bypass valve 112. Intake air passing through compressor 102 is boosted to a pressure above atmospheric pressure with compressor 102 driven by exhaust flow through turbine 104 via shaft 106. Boosted intake airflow is cooled by passing through an intercooler (I/C) 120. Intake air from intercooler 120 and/or bypass passage 110 is distributed to the plurality of cylinders 12 via an intake manifold, indicated generally by reference numeral 50 after modulation by a throttle valve 56 or other airflow control device used to modulate the airflow and control manifold pressure within intake manifold 52 to control engine torque to a desired output torque in cooperation with ignition timing and fuel control, particularly for spark-ignition engines. Alternatively, or in combination, timing or positioning of intake valves 16 may be used to provide intake valve throttling to reduce pumping losses. In applications so equipped, throttle valve 56 may be mechanically or electronically controlled by an appropriate actuator 58 based on a corresponding throttle position (TP) signal generated by controller 30. The throttle position (TP) signal may be generated to position the throttle in response to a corresponding engine output or torque requested by an operator via accelerator pedal 46. A throttle position sensor 60 provides a feedback signal to controller 30 indicative of the actual position of throttle valve 56 to implement closed loop control of throttle valve 56. Although the embodiment illustrated in FIG. 1 is a spark-ignited port injected engine, the system and method for controlling an engine according to the present disclosure are generally independent of the engine technology and apply to direct injection and/or compression ignition engines or modes of operation.

A manifold absolute pressure sensor 70 is used to provide a signal (MAP) indicative of the manifold pressure to controller 30. Air passing through intake manifold 52 enters combustion chamber 14 through appropriate control of one or more intake valves 16. Timing, activation, and deactivation of intake valves 16 and exhaust valves 18 may be controlled using electromagnetic actuators 72, 74, using a conventional camshaft arrangement, using a variable camshaft timing arrangement, or using a combination thereof depending on the particular application and implementation. In one embodiment, intake valves 16 are constant lift valves that are electromagnetically operated by controller 30 to control intake valve timing including opening, closing, and duration with exhaust valves 18 being operated by a camshaft or variable cam timing device.

Rotational position information for controlling the engine may be provided by a crankshaft position sensor 80 that includes a toothed wheel 82 and an associated sensor 84. Crankshaft position sensor 80 may be used to generate a signal (PIP) used by controller 30 for fuel injection and ignition timing. In one embodiment, a dedicated integrated circuit chip within controller 30 is used to condition/process the raw rotational position signal generated by position sensor 80 and outputs a signal (PIP) once per cylinder per combustion cycle, i.e. for a eight-cylinder engine, eight PIP signals per combustion cycle are generated for use by the control logic. Crankshaft position sensor 80 may also be used to determine engine rotational speed and to identify cylinder combustion based on an absolute, relative, or differential engine rotational speed.

Depending on the particular application, an exhaust gas oxygen sensor 90 may be used to provide a signal (EGO) to controller 30 indicative of whether the exhaust gasses are lean or rich of stoichiometry. Likewise, depending upon the particular application, sensor 90 may provide a two-state signal corresponding to a rich or lean condition, or alternatively a signal that is proportional to the stoichiometry of the exhaust gases. When provided, this signal may be used to adjust the air/fuel ratio, or control the operating mode of one or more cylinders, for example. The exhaust gas is passed through the exhaust manifold and one or more catalysts 92 before being exhausted to atmosphere.

A fuel injector injects an appropriate quantity of fuel in one or more injection events for the current operating mode based on a signal (FPW) generated by controller 30 and processed by driver. For spark-ignition applications, controller 30 generates a spark signal (SA) that is processed by an ignition system to control one or more spark plugs associated with each cylinder and initiate combustion within chamber 14.

Controller 30 includes software and/or hardware implementing control logic to selectively operate in a naturally aspirated operating mode by coordinated control of compressor bypass valve 112 and turbine bypass valve 116 to bypass turbocharger 100 in response to at least one operating parameter. As described in greater detail with reference to FIGS. 2-3, controller 30 may determine current operating conditions by monitoring at least one engine/ambient parameter, such as engine speed, boost pressure, and/or load and selectively bypass turbocharger 100 in response. In one embodiment compressor bypass valve 112 and turbine bypass valve 116 are operated substantially simultaneously in response to engine speed exceeding a corresponding threshold to redirect substantially all intake airflow around compressor 102 and substantially all exhaust flow around turbine 104 so that the engine is naturally aspirated.

Figure 2:
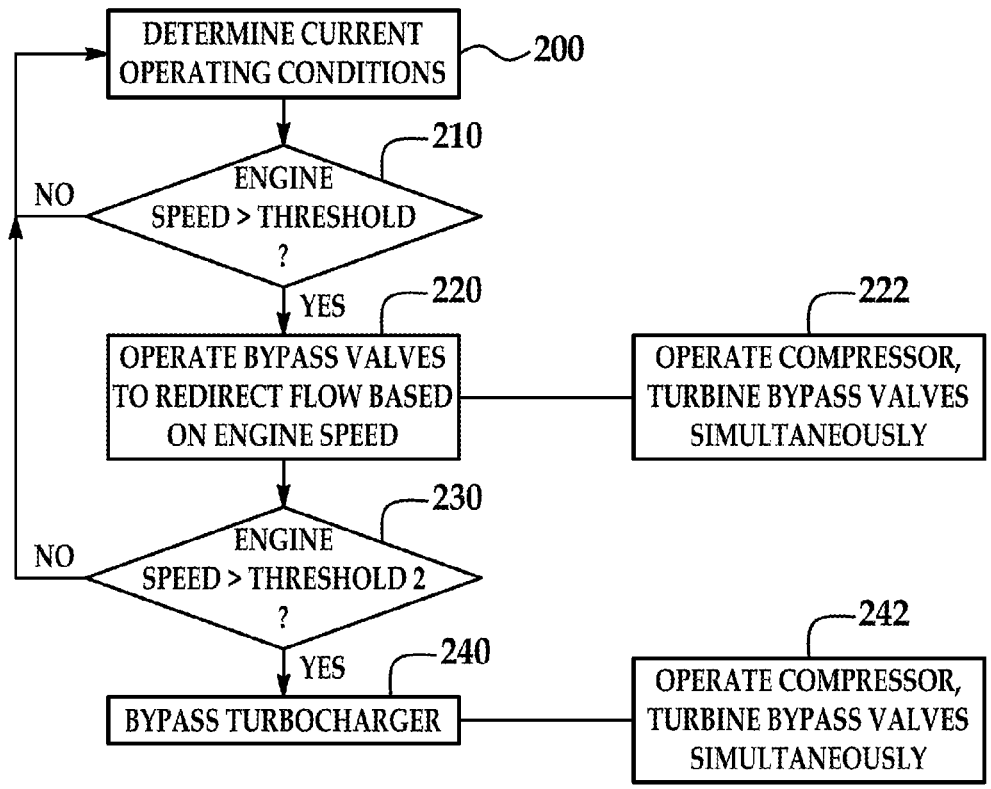
FIG. 2 is a flowchart illustrating operation of a system or method for controlling an engine having an exhaust gas turbocharger according to embodiments of the present disclosure.

FIG. 2 is a flow chart illustrating operation of one embodiment of a system or method for controlling a turbocharged engine according to the present disclosure. The diagram of FIG. 2 provides representative control strategies for an internal combustion engine to selectively redirect at least a portion of intake/exhaust flow around a turbocharger in response to one or more engine and/or ambient operating parameters exceeding a corresponding threshold. The control strategies and/or logic illustrated in FIG. 2 represent any of a number of known processing strategies such as event-driven, interrupt-driven, multi-tasking, multi-threading, and the like. As such, various steps or functions illustrated may be performed in the sequence illustrated, in parallel, or in some cases omitted. Although not explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 30 (FIG. 1). Of course, the control logic may be implemented in software, hardware, or a combination of software and hardware in one or more controllers depending upon the particular application. When implemented in software, the control logic may be provided in one or more computer-readable storage media 28 (FIG. 1) having stored data representing code or instructions executed by a computer to control the engine. The computer-readable storage media may include one or more of a number of known physical devices which utilize electric, magnetic, and/or optical storage to keep executable instructions and associated calibration information, operating variables, and the like.

Block 200 of FIG. 2 represents determining current operating conditions, which may include current operating mode(s) (idle, cruise, start, shutdown, reduced displacement, etc.) in addition to engine, vehicle, and/or ambient conditions or parameters (temperature(s), pressure(s), speed(s), state of accessory operation, accelerator pedal position, gear, etc.). Current engine and/or ambient operating conditions or modes may be used in controlling bypass airflow around compressor 102 via bypass valve 112 and bypass exhaust flow around turbine 104 via bypass valve 116 to provide a desired vehicle performance, fuel economy, and/or emissions, for example. In one embodiment, bypass valves 112, 116 are controlled using a speed-load table stored in one or more look-up tables.

At least one operating parameter is compared to a corresponding threshold as represented by block 210. In the illustrated embodiment, block 210 determines whether engine speed exceeds a corresponding first threshold. When engine speed exceeds a first threshold, compressor bypass valve 112 and turbine bypass valve 116 are operated to redirect at least a portion of the intake flow and exhaust flow, respectively, around the turbocharger as represented by block 220. Depending on the particular application, the bypass valves may be controlled to modulate flow based on engine speed and/or other operating parameters between a first threshold and a second threshold as generally represented by block 230. In one embodiment, compressor bypass valve 112 and turbine bypass valve 116 are operated substantially simultaneously as represented by block 222. When one or more operating parameters exceed a second threshold, as represented by block 230, compressor bypass valve 112 and turbine bypass valve 116 are moved to a wide open position to redirect substantially all flow around the turbocharger as represented by block 240. The compressor bypass valve 112 and turbine bypass valve 116 may be operated substantially simultaneously as represented by block 242.

Depending upon the particular application and implementation, the partial bypass or modulated airflow control represented by blocks 210, 220, and 222 is optional and may be omitted. Those of ordinary skill in the art will recognize that control of bypass valves 112, 116 may use various common control strategies to provide smooth transitions between boosted and naturally aspirated modes and prevent cycling when operating near an associated threshold.

Figure 3:
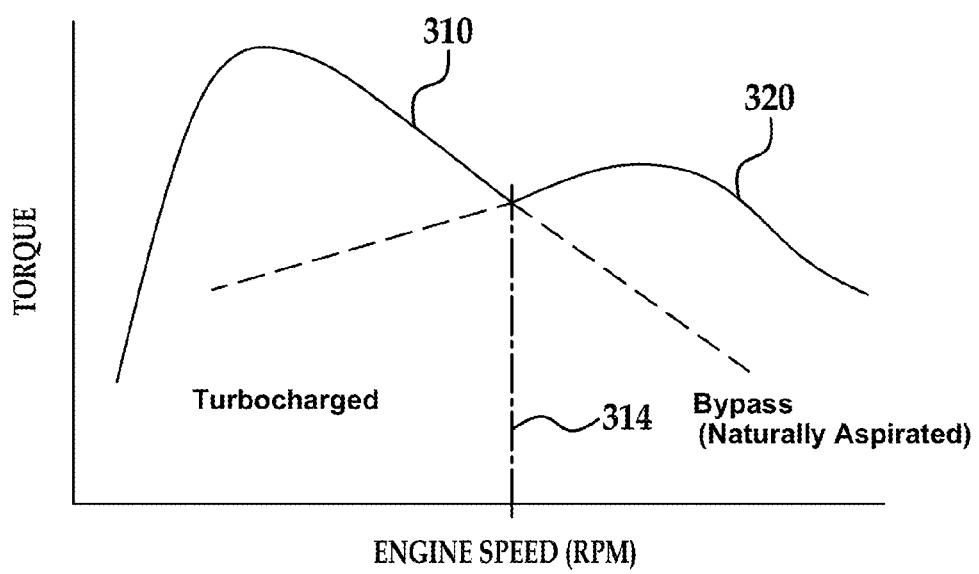
FIG. 3 is a graph illustrating torque as a function of engine speed for a representative embodiment according to the present disclosure.

FIG. 3 is a graph illustrating operation of a turbocharged engine operable in a naturally aspirated mode for a representative embodiment according to the present disclosure. Line 310 represents torque as a function of engine speed for lower engine speeds where the turbocharger boost is applied with the intake airflow being boosted by the turbocharger compressor, which is driven by the exhaust flow through the turbocharger turbine. When engine speed exceeds a corresponding threshold as represented by line 314, the turbocharger is bypassed to provide naturally aspirated operation with a corresponding torque curve 320.

As such, embodiments according to the present disclosure provide a system and method for providing boost only at lower engine speeds with naturally aspirated engine operation at higher engine speeds to provide a more efficient boosting system as well as a lighter, more efficient, and lest costly base engine. Providing boost at lower engine speeds improves performance feel and may result in improved fuel economy by more effective powertrain matching and engine downsizing for a particular application. In addition, with boost applied only for lower engine speeds, the engine structure and materials do not need to be upgraded resulting in a cost and weight advantage while reducing manufacturing complexity.

While one or more embodiments have been illustrated and described, it is not intended that these embodiments illustrate and describe all possible embodiments within the scope of the claims. Rather, the words used in the specification are words of description rather than limitation, and various changes may be made without departing from the spirit and scope of the disclosure. While various embodiments may have been described as providing advantages or being preferred over other embodiments or prior art implementations with respect to one or more desired characteristics, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed:

1. A method for controlling an engine having a turbocharger, comprising:
    simultaneously redirecting a portion of intake airflow around a compressor and a portion of exhaust flow around a turbine in response to an operating parameter exceeding a first threshold; and
    simultaneously redirecting all intake airflow to bypass the compressor and directly enter engine cylinders and all exhaust flow to bypass the turbine in response to the operating parameter exceeding a second threshold different from the first threshold to achieve a naturally aspirated mode.

2. The method of claim 1 wherein the portion of redirected intake airflow and exhaust flow is modulated as the operating parameter changes between the first threshold and the second threshold.

3. The method of claim 1 wherein the operating parameter comprises a plurality of operating parameters including engine speed and load.

4. An engine comprising:
    a single, single-stage turbocharger with a compressor and a turbine;
    compressor and turbine bypass passages sized to redirect substantially all intake airflow and exhaust flow around the compressor and turbine, respectively; and
    a controller operating bypass valves to at least partially bypass the turbocharger in response to engine speed exceeding a first threshold, and substantially completely bypass the turbocharger in response to engine speed exceeding a different second threshold.

5. The engine of claim 4 wherein the controller operates the bypass valves substantially simultaneously to bypass the turbocharger in response to engine speed exceeding the first threshold.

6. The engine of claim 4 wherein the controller operates the bypass valves substantially simultaneously to redirect a portion of intake airflow and exhaust flow around the turbocharger when engine speed exceeds the first threshold.

7. The engine of claim 6 wherein the controller operates the bypass valves substantially simultaneously to redirect substantially all intake airflow and substantially all exhaust flow around the turbocharger compressor and turbine, respectively, in response to engine speed exceeding the second threshold.

8. The engine of claim 7 wherein the controller modulates the bypass valves to control the portion of redirected intake airflow and exhaust flow as engine speed changes between the first and second thresholds.

* * * * *